(12) United States Patent
Altman

(10) Patent No.: US 6,969,211 B2
(45) Date of Patent: Nov. 29, 2005

(54) TUBULAR FRAME STRUCTURE CONNECTOR SYSTEM

(76) Inventor: Lee E. Altman, 2906 Jenny Jae La., Crystal Lake, IL (US) 60012

( * ) Notice: Subject to any disclaimer, the term of this patent is extended or adjusted under 35 U.S.C. 154(b) by 114 days.

(21) Appl. No.: 10/325,417

(22) Filed: Dec. 19, 2002

(65) Prior Publication Data

US 2004/0120759 A1    Jun. 24, 2004

(51) Int. Cl.[7] .............................................. F16B 2/14
(52) U.S. Cl. ............................... 403/374.4; 403/374.3; 403/171; 403/254; 403/255; 403/368; 403/370; 403/371; 52/655.1; 52/656.9
(58) Field of Search .................... 403/169–171, 403/176, 192, 193, 217, 218, 252–255, 365, 403/367, 368, 370, 371, 374.1, 374.2, 374.3, 403/374.4; 256/1, 19, 24, 25, 32; 52/655.1, 52/656.9

(56) References Cited

U.S. PATENT DOCUMENTS

| | | | | |
|---|---|---|---|---|
| 614,944 A | * | 11/1898 | Gaylor | 403/233 |
| 3,545,796 A | * | 12/1970 | Nicholls | 403/187 |
| 3,864,051 A | * | 2/1975 | Reid | 403/408.1 |
| 5,111,631 A | * | 5/1992 | Flood et al. | 52/646 |
| 6,095,713 A | * | 8/2000 | Doyle et al. | 403/97 |

* cited by examiner

Primary Examiner—Daniel P. Stodola
Assistant Examiner—Michael P. Ferguson
(74) Attorney, Agent, or Firm—Meroni & Meroni, P.C.; Charles F. Meroni, Jr.

(57) ABSTRACT

A multi-tubular connector apparatus comprising a connector body having a shoulder portion substantially matching the outer profile of a tubular member and an open fastener shaft through the body. Connecting slots within the shoulder portion have open ends within the top of the shoulder and apertures through the side of the shoulder. Deflectable legs are radially spaced about the open fastener shaft. A wedge member having an open fastener shaft coacts with the inner face of the deflectable legs. A connector cap having a fastener aperture covers the connecting slots. An elongated fastener fits through the connector cap, open fastener shaft of the connector body, open fastener shaft of the wedge member to provide means for tensioning the wedge member against the deflectable leg, outwardly deflecting the deflectable leg against inner walls of a tubular member frictionally connecting the apparatus to the tubular member.

14 Claims, 13 Drawing Sheets

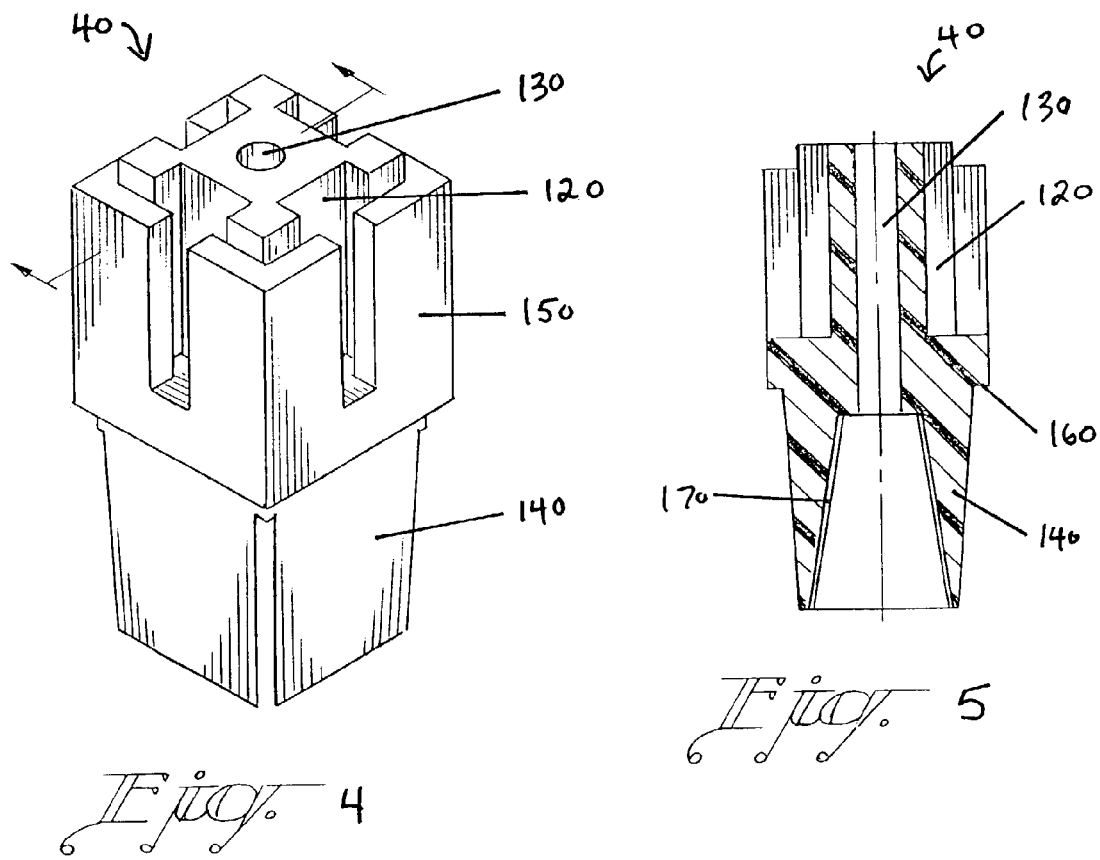
Fig. 4
Fig. 5
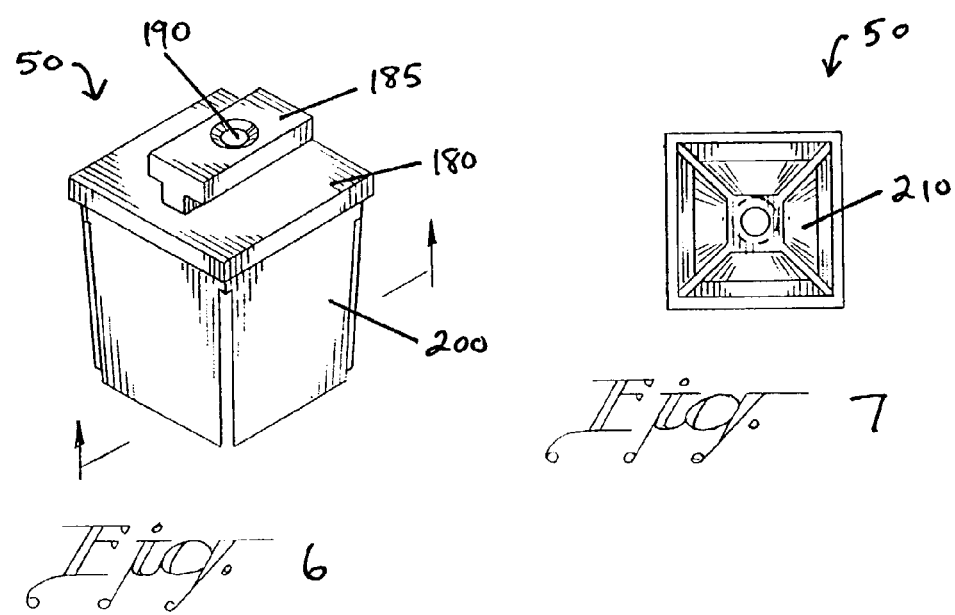
Fig. 6
Fig. 7

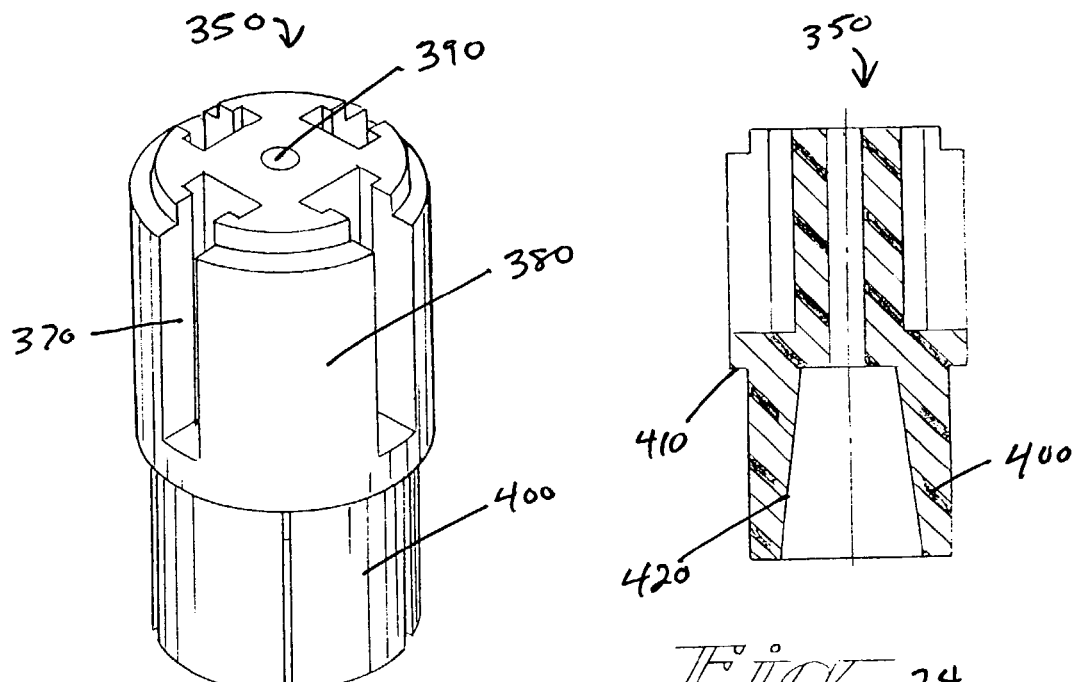
Fig. 23
Fig. 24
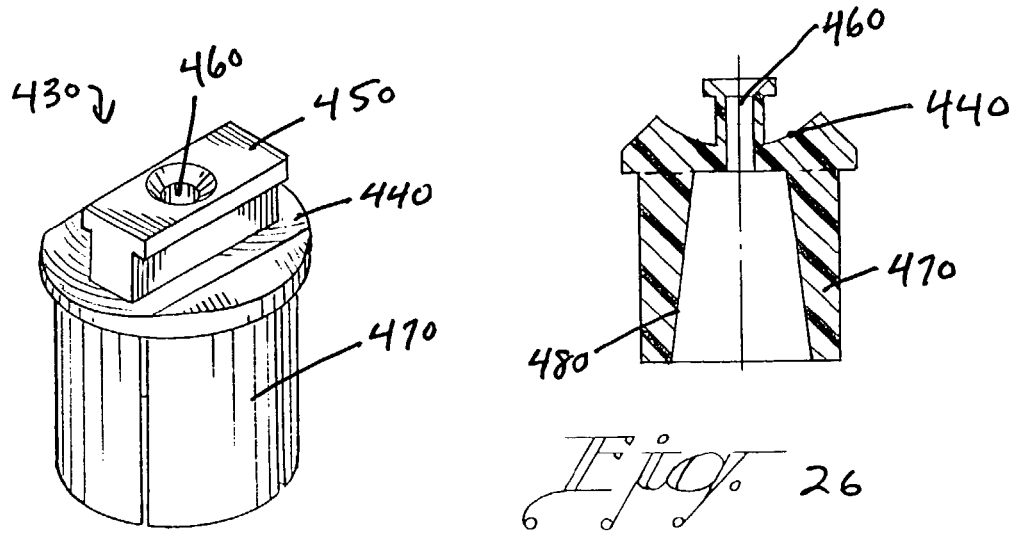
Fig. 25
Fig. 26

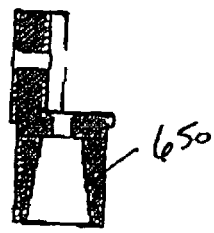
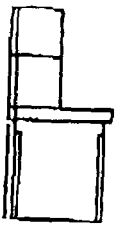
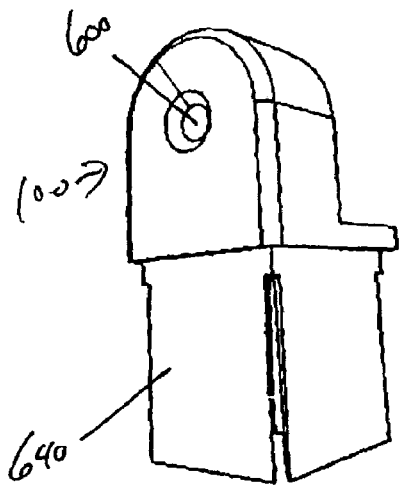
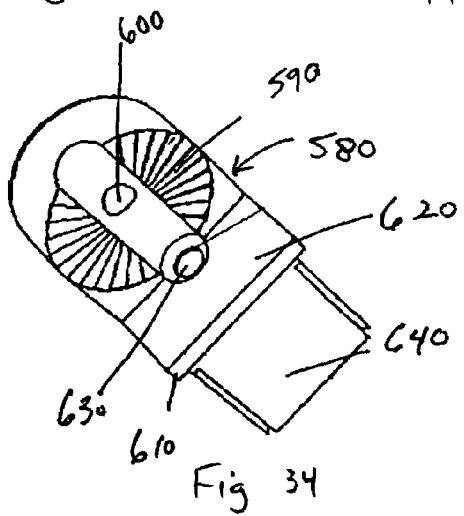
Fig. 36
Fig. 37
Fig. 38
Fig. 33
Fig. 34
Fig. 35

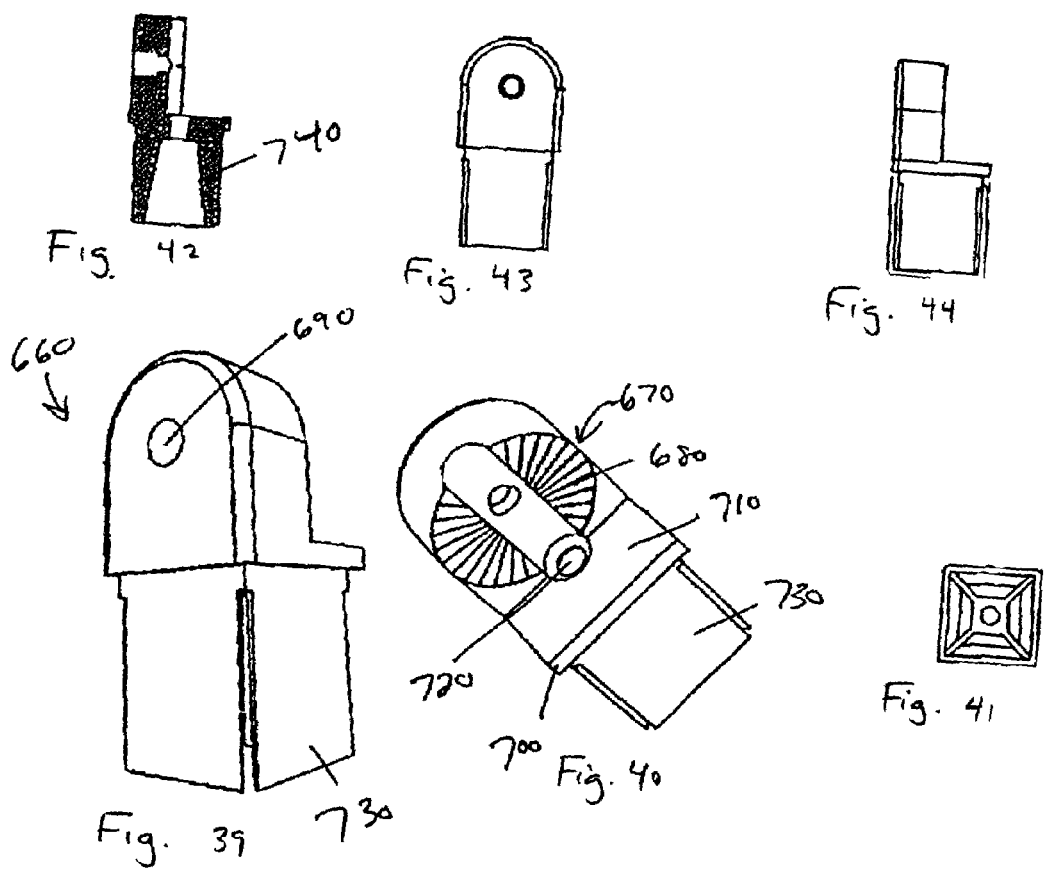

TUBULAR FRAME STRUCTURE CONNECTOR SYSTEM

BACKGROUND OF THE INVENTION

1. Field of the Invention

The present invention generally relates to tubular frame structures. More specifically, the present invention relates to an improved connector for tubular frame structures.

2. Description of the Prior Art

The versatility of using multiple hollow tubes to create structures for many different purposes make the use of hollow tubes to build such structures extremely attractive. Several different types of apparatus and systems have been devised over the years to connect multiple tubes in a multi-tubular structure. Several of these systems and other relevant modular connecting systems are disclosed here.

U.S. Pat. No. 4,123,180 issued to Nehma discloses a tube connector system adapted to convenient and removable assembling of square, round or other shaped hollow tubes. It finds use in construction of temporary and permanent store displays, furniture, shelves, and the like. The connector comprises a joining member having a plurality of insertion members each of which is closely but slidably fitted to the aperture in the end of a hollow tube. Each insertion member has a plurality of recesses on the side thereof. Each recess is provided with a resilient spring member permitting forceable entry of the insertion member and retaining it removably in place in the tube.

U.S. Pat. No. 5,062,250 issued to Buzzella discloses an insulating panel system having I-shaped and T-shaped panel connectors. The C-shaped end portions of the insulating panels slide within the I-shaped channel to connect two insulating panels together.

U.S. Pat. No. 5,971,508 issued to Deimen discloses a modular wireway which is adapted to be utilized with easily mountable, demountable and remountable attachments. FIG. 10 discloses an I shaped and a T shaped connection for connecting attachments.

U.S. Pat. No. 6,309,155 issued to Huang discloses an expanding sleeve anchor structure includes a nail base tube cooperating with a tapered spreading member. The nail base tube has an upper section provided with a plurality of separating lines each having an elongated transverse hollow slot substantially centered thereon on which is used for reducing the stress concentration of the upper section of the nail base tube when the upper section of the nail base tube is forced to expand outward resulting in complete expansion.

The previously issued United States Patents disclose systems that have been previously devised to create modular structures. However, there is still a need for a tubular connector that has improved strength and assembly characteristics. Accordingly, the claimed invention provides an improved connector apparatus and system for connecting multiple tubes in a multi-tubular structure.

SUMMARY OF THE INVENTION

The primary object of the claimed invention is to provide an improved connector system for connecting multiple tubes of a multi-tubular structure.

Another object of the claimed invention is to provide a connector system for connecting multiple tubes of a multi-tubular structure that is easier to disassemble after use.

A further object of the claimed invention is to provide a connector system for connecting multiple tubes of a multi-tubular structure that provides increased frictional connecting strength between a connector apparatus and a tubular member.

An even further object of the claimed invention is to provide a connector system for connecting multiple tubes of a multi-tubular structure that allows tubes to be connected at a plurality of angularities with respect to one another.

A yet further object of the claimed invention is to provide a connector system for connecting multiple tubes of a multi-tubular structure that has a square or round profile.

A still further object of the claimed invention is to provide a connector system for connecting multiple tubes of a multi-tubular structure that is capable of connecting tubes at variable angles.

To achieve the foregoing objectives as well as others that will become apparent after a reading of the specification, claims and drawings, a connector apparatus and system for connecting multiple tubes of a multi-tubular structure is provided.

The connector system generally comprises a connector body, a connector end, a wedge member, a connector cap, a connector blank, a connector leveler, an angular connector end and an angular adapter. The parts that make up the connector system are preferably made of synthetic injection molded plastic and use elongated metallic fasteners to connect the parts of the connector apparatus and system together.

The connector body has a plurality of radially spaced connector slots to receive connector tabs of other parts of the system. Radially spaced deflectable legs are spaced about fastener shaft and are offset with regard to the outer side surfaces of the connector body so that the side surfaces of the connector body will be substantially flush with the side surfaces of a tubular member when the deflectable legs are inserted within an open end of a tubular member. Each deflectable leg has a smoothly sloped inner face that interacts with the sloped outer faces of the wedge member.

The connector end has a front face shaped to fit flushly against the side surfaces of the connector body and a connector tab extending from the front face that is sized and shaped to be retained by a connector slot of the connector body. A vertical shaft is centrally located within the connector end. A plurality of radially positioned deflectable prongs are spaced about the second open end of the open fastener shaft and are offset with regard to the outer side surfaces of the connector body so that the side surfaces of the connector body will be substantially flush with the side surfaces of a tubular member when the deflectable prongs are inserted within an open end of a tubular member. Each deflectable prong has a smoothly sloped inner face.

The wedge member is sized and shaped to fit among the deflectable legs of the connector body and has a threaded fastener shaft to engage threads of the elongated fastener that holds the parts of the apparatus and system together. The outer faces of the wedge member are sloped to interact with the inner sloped surfaces deflectable legs and deflectable prongs. The wedge member also fits among the deflectable prongs of the connector end.

The connector cap covers the connector slots of the connector body to hold the connector tabs of the connector ends in place during use. The connector cap has a fastener aperture to receive the elongated fastener during use.

The blank is used to fill connector slots of the connector body that are not used in the construction of a multi-tubular structure using the apparatus and system of the claimed invention. The blank has a connector tab similar to the connector tab of the connector end and has a spacer panel with a thickness roughly equal to the thickness of the front face of the connector end to present a uniform appearance about the connector body.

The leveler body has a connector tab similar to that of the connector end for placement within the connector slots of the connector body when the connector system is used to construct a multi-tubular structure. The improved connector system may also include a plurality of feet of this type to level a multi-tubular structure.

When the elongated fastener is screwed into the threads of the fastener shaft of the wedge member, the outer sloped faces of the wedge member move against the sloped inner surfaces of the deflectable legs, coacting to deflect the deflectable legs outwardly. The deflectable legs radially deflect toward the inner walls of a tubular member, frictionally connecting the connector apparatus to the tubular member.

BRIEF DESCRIPTION OF THE DRAWINGS

FIG. 1 shows a multi-tubular structure using the square connector system embodiment of the claimed invention.

FIG. 2 shows a multi-tubular structure in the form of office cubicle walls using the square connector system embodiment of the claimed invention.

FIG. 3 shows a multi-tubular structure in the form of a building front awning using the square connector system embodiment of the claimed invention.

FIG. 4. FIG. 4 shows a perspective view of the square embodiment of the connector body.

FIG. 5. FIG. 5 shows a cross sectional view of the square embodiment of the connector body.

FIG. 6. FIG. 6 shows a perspective view of the square embodiment of the connector end.

FIG. 7. FIG. 7 shows a bottom view of the square embodiment of the connector end.

FIG. 8 shows a perspective view of the wedge member of the connector system.

FIG. 9 shows a cross sectional view of the wedge member of the connector system.

FIG. 10 shows a perspective view of the square embodiment of the connector cap showing the detail of the bottom face.

FIG. 11 shows a cross sectional view of the square embodiment of the connector cap.

FIG. 12 shows a perspective view of the square embodiment of the connector system blank.

FIG. 13 shows a side view of the square embodiment of the connector system blank.

FIG. 14 shows a perspective view of the square embodiment of the connector system leveler body.

FIG. 15 shows a cross sectional view of the square embodiment of the connector system leveler.

FIG. 16 shows a perspective view of the square embodiment of the connector apparatus.

FIG. 17 shows a cross sectional view of a disengaged connector apparatus inserted into an end of a square tubular member.

FIG. 18 shows a cross sectional view of a connector apparatus engaged within an end of a square tubular member.

FIG. 19 shows a cross sectional view of a plurality of connector ends adjacent a top view of the square embodiment of the connector body.

FIG. 20 shows a multi-tubular structure using the round connector system embodiment of the claimed invention.

FIG. 21 shows a multi-tubular structure in the form of office cubicle walls using the round connector system embodiment of the claimed invention.

FIG. 22 shows a multi-tubular structure in the form of a building front awning using the round connector system embodiment of the claimed invention.

FIG. 23. FIG. 23 shows a perspective view of the round embodiment of the connector body.

FIG. 24. FIG. 24 shows a cross sectional view of the round embodiment of the connector body.

FIG. 25. FIG. 25 shows a perspective view of the round embodiment of the connector end.

FIG. 26. FIG. 26 shows a cross sectional view of the round embodiment of the connector end.

FIG. 27 shows a top view of the round embodiment of the connector cap.

FIG. 28 shows a cross sectional view of the round embodiment of the connector cap.

FIG. 29 shows a perspective view of the round embodiment of the connector system leveler body.

FIG. 30 shows a cross sectional view of the round embodiment of the connector system leveler body.

FIG. 31 shows a perspective view of the round embodiment of the connector apparatus.

FIG. 32 shows a perspective view of the round embodiment of the connector system blank.

FIG. 33. FIG. 33 shows a perspective view of the square embodiment of the male angular tubular connector end.

FIG. 34. FIG. 34 shows another perspective view of the square embodiment of the male angular tubular connector end.

FIG. 35. FIG. 35 shows a bottom view of the square embodiment of the male angular tubular connector end.

FIG. 36. FIG. 36 shows a cross sectional view of the square embodiment of the male angular tubular connector end.

FIG. 37. FIG. 37 shows a side view of the square embodiment of the male angular tubular connector end.

FIG. 38. FIG. 38 shows another side view of the square embodiment of the male angular tubular connector end.

FIG. 39. FIG. 39 shows a perspective view of the square embodiment of the female angular tubular connector end.

FIG. 40. FIG. 40 shows another perspective view of the square embodiment of the female angular tubular connector end.

FIG. 41. FIG. 41 shows a bottom view of the square embodiment of the female angular tubular connector end.

FIG. 42. FIG. 42 shows a cross sectional view of the square embodiment of the female angular tubular connector end.

FIG. 43. FIG. 43 shows a side view of the square embodiment of the female angular tubular connector end.

FIG. 44. FIG. 44 shows another side view of the square embodiment of the female angular tubular connector end.

FIG. 45 shows a perspective view of the angular adapter of the connector system.

FIG. 46 shows another perspective view of the angular adapter of the connector system.

FIG. 47 shows an end view of the angular adapter of the connector system.

FIG. 48 shows a side view of the angular adapter of the connector system.

FIG. 49 shows another side view of the angular adapter of the connector system.

DETAILED DESCRIPTION OF THE PREFERRED EMBODIMENT

Figure 1:
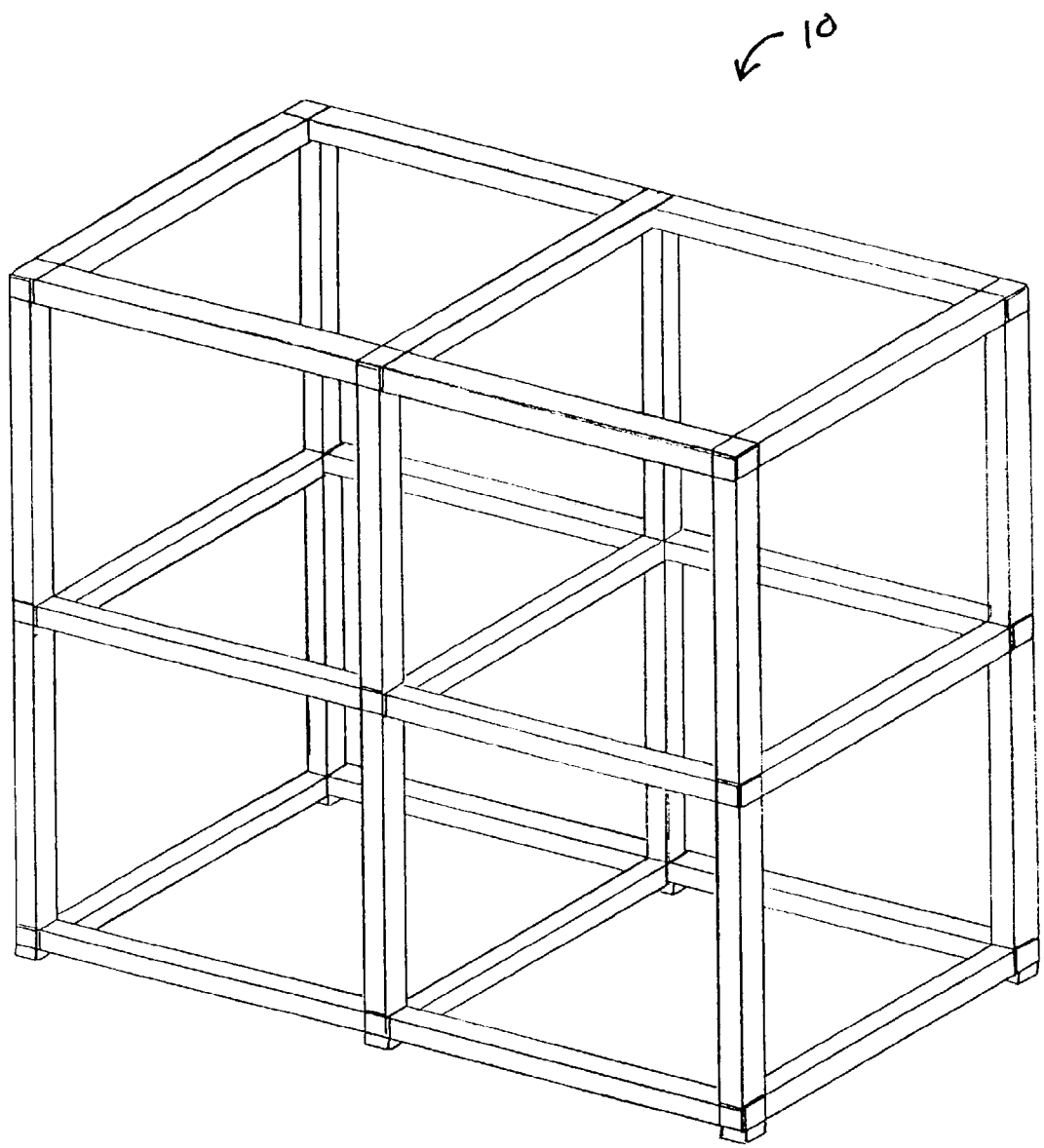
FIG. 1.
Figure 2:
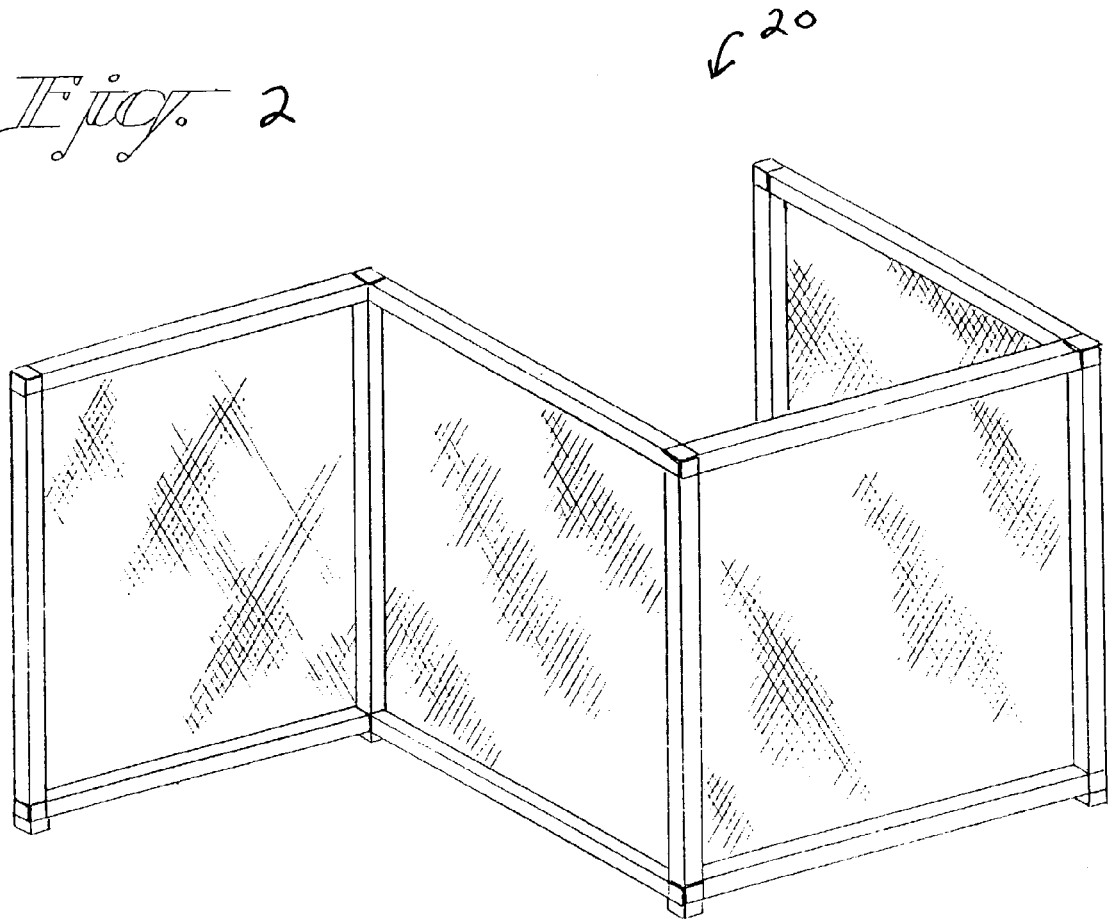
FIG. 2.
Figure 3:
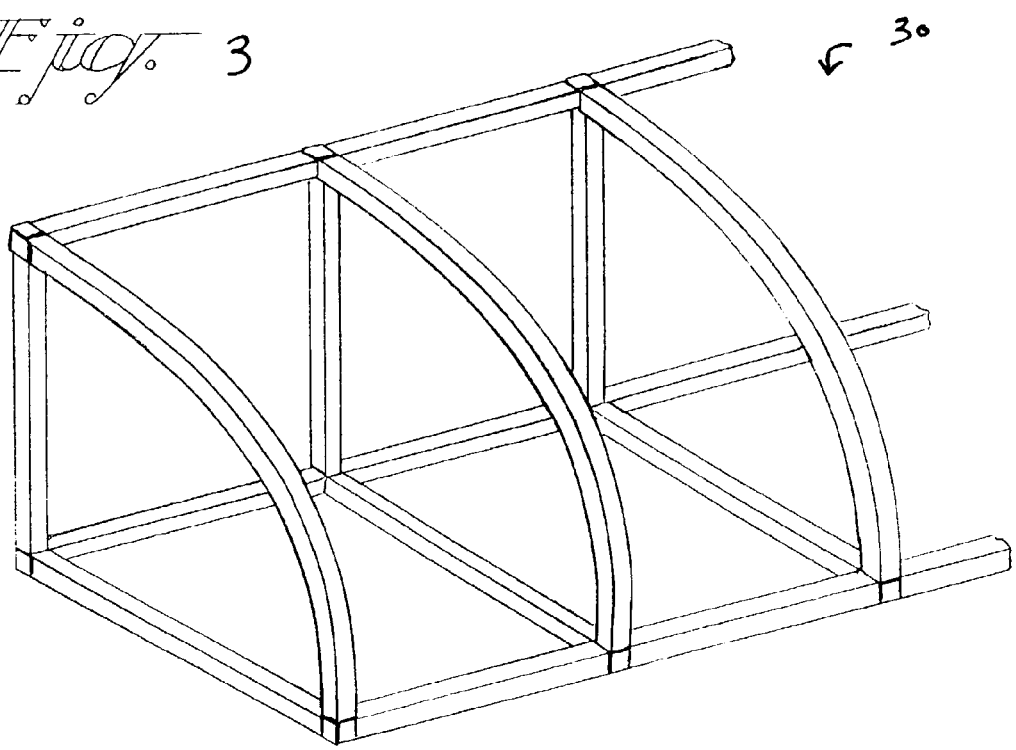
FIG. 3.

Turning now to the drawings, FIGS. 1–3 show three different examples of a multi-tubular structure 10 having an improved tubular connector system embodying the claimed invention connecting the multiple tubes of the multi-tubular structures. FIG. 1 shows a multi-tubular structure using the square connector system embodiment of the claimed invention. FIGS. 2 and 3 show the square embodiment of the connector system being used to form office cubicle walls 20 and a building front awning 30.

The connector system shown in FIGS. 4–16 and 33–49 generally comprises a connector body 40, a connector end 50, a wedge member 60, a connector cap 70, a connector blank 80, a connector leveler 90, an angular connector end 100 and an angular adapter 110. The parts that make up the connector system are preferably made of synthetic injection molded plastic and use metal machine screws to connect the parts of the connector apparatus and system together. The connector system parts illustrated in FIGS. 4–16 are described in the context of a connector system sized and shaped to be used with 1 inch square tubing. However, the connector system and apparatus can be sized and shaped to be used with a plurality of different sizes and shapes.

FIGS. 4 and 5 show a perspective view and a cross sectional view of the square embodiment of the connector body 40 sized and shaped to connect square tubing having a 1 inch cross section. The connector body 40 has a plurality of 0.25 inch by 0.375 inch radially spaced connector slots 120 with an open end within a top face 125 of the connector body 40. Each connector slot 120 has an open ended 0.187 inch wide aperture through a side surface of the connector body 40. A vertically oriented 0.187 inch open fastener shaft 130 is centrally located within the connector body 40. The open fastener shaft 130 has a first open end 132 within the top face 125 of the connector body 40 and a second open end 134 within the bottom of the connector body 40. A plurality of 0.875 inch long radially spaced deflectable legs 140 are spaced about the second open end 134 of the open fastener shaft 130 and are offset with regard to the outer side surfaces 150 of the connector body 40 so that the side surfaces 150 of the connector body 40 will be substantially flush with the side surfaces of a tubular member when the deflectable legs 140 are inserted within an open end of a tubular member. The 0.125 inch offset of the deflectable legs creates a shoulder portion 160 to overlie the thickness of the walls of a square tubular member when the deflectable legs 140 are inserted within an open end of a square tubular member. Each deflectable leg 140 has a smoothly sloped inner face 170 that interacts with the sloped outer faces of the wedge member 60 when the wedge member 60 is tightened against the deflectable legs 140.

FIGS. 6 and 7 show a perspective view and a bottom view of the square embodiment of the connector end 50 sized and shaped to be used with 1 inch square tubing. The connector end 50 has a 1 inch square front face 180 shaped to fit flushly against the side surfaces 150 of the connector body 40 and a 0.375 inch by 0.75 inch connector tab 185 extending 0.250 inch from the front face 180 that is sized and shaped to be retained by a connector slot 120 of the connector body 40. A vertically oriented 0.188 inch open fastener shaft 190 is centrally located within the connector end 50. The open fastener shaft 190 has a first open end 192 within the connector tab and a second open end 194 within the bottom of the connector end 50. A plurality of 0.875 inch radially positioned deflectable prongs 200 are spaced about the second open end 194 of the open fastener shaft 190 and are offset with regard to the outer side surfaces 150 of the connector body 40 so that the side surfaces 150 of the connector body 40 will be substantially flush with the side surfaces of a tubular member when the deflectable prongs 200 are inserted within an open end of a tubular member. Each deflectable prong 200 has a smoothly sloped inner face 210 that interacts with the sloped outer faces of the wedge member 60 when the wedge member 60 is tightened against the deflectable prongs 200.

Figure 8:
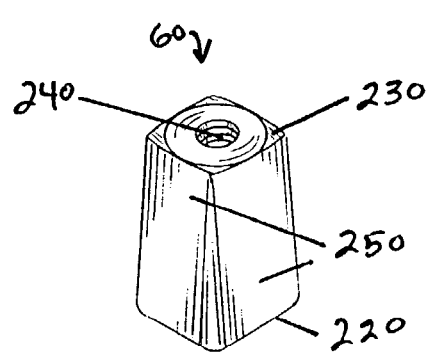
FIG. 8.
Figure 9:
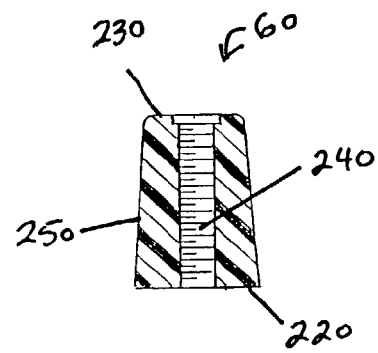
FIG. 9.

FIGS. 8 and 9 show a perspective view and a cross sectional view of the wedge or expansion member 60 sized and shaped to be used with a 1 inch connector body 40 and connector end 50. The wedge member 60 is sized and shaped to fit among the deflectable legs 140 of the connector body 40 and connector end 50 having a 0.65 inch square bottom end 220 and a 0.435 inch square top end 230. A 0.188 inch open fastener shaft 240 is positioned within the wedge member 60 to be axially aligned with the open fastener shaft 130 of the connector body 40 when the wedge member 60 is placed among the deflectable legs 140. The open fastener shaft 240 is threaded to engage threads of the elongated fastener 310 that holds the parts of the apparatus and system together. The outer faces 250 of the wedge member 60 are sloped to interact with the inner sloped surfaces 170 deflectable legs 140 and deflectable prongs 200 of the connector end 50.

Figure 10:
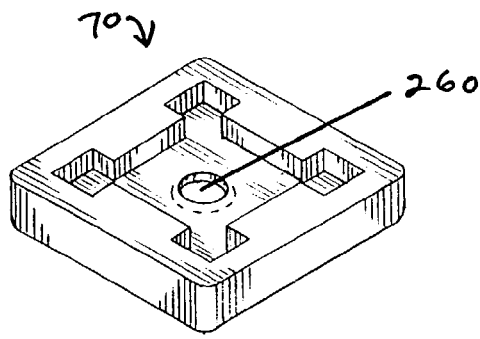
FIG. 10.
Figure 11:
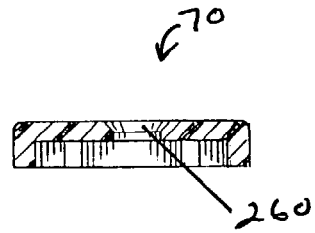
FIG. 11.

FIGS. 10 and 11 show a perspective view and cross sectional view of the square embodiment of the connector cap 70 to be used with the 1 inch square connector body 40. The connector cap 70 is 1 inch square to cover the connector slots 120 of the connector body 40 and to hold the connector tabs 185 of the connector ends 50 in place during use. The connector cap 70 has a countersunk fastener aperture 260 to receive a #6 machine screw that is positioned to be axially aligned with the open fastener shaft 130 of the connector body 40 when the connector cap 70 is placed adjacent the top face 125 of the connector body 40.

Figure 12:
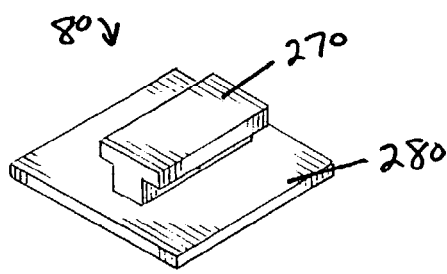
FIG. 12.
Figure 13:
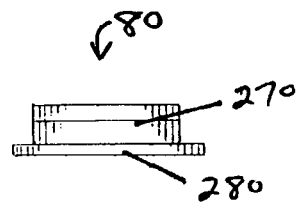
FIG. 13.

FIGS. 12 and 13 show a perspective view and a side view of the 1 inch square embodiment of the connector system blank 80. The blank 80 is used to fill connector slots 120 of the connector body 40 that are not used in the construction of a multi-tubular structure using the apparatus and system of the claimed invention. The blank 80 has a connector tab 270 similar to the connector tab 185 of the connector end 50 and has a 0.63 inch thick spacer panel 280. The thickness of the spacer panel 280 is roughly equal to the thickness of the front face 180 of the connector end 50 to present a uniform appearance about the connector body 40.

Figure 14:
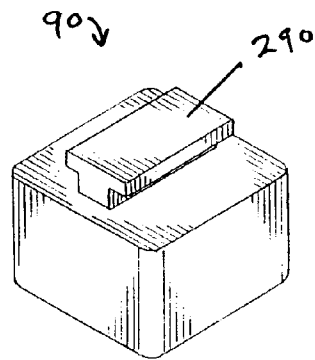
FIG. 14.
Figure 15:
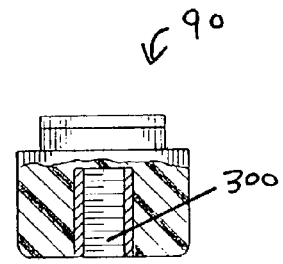
FIG. 15.

FIGS. 14 and 15 show a perspective view and a cross sectional view of the 1 inch square embodiment of the connector system leveler body 90. The leveler body 90 has a connector tab 290 similar to that of the connector end 50 for placement within the connector slots 120 of the connector body 40 when the connector system is used to construct a multi-tubular structure. The leveler body 90 has a ¼×20 threaded insert 300 for receiving a foot (not shown) with a threaded stud to be variably engaged with the threads of the threaded insert 300. The improved connector system may also include a plurality of feet of this type to level a multi-tubular structure such as those shown in FIGS. 1 and 2.

Figure 16:
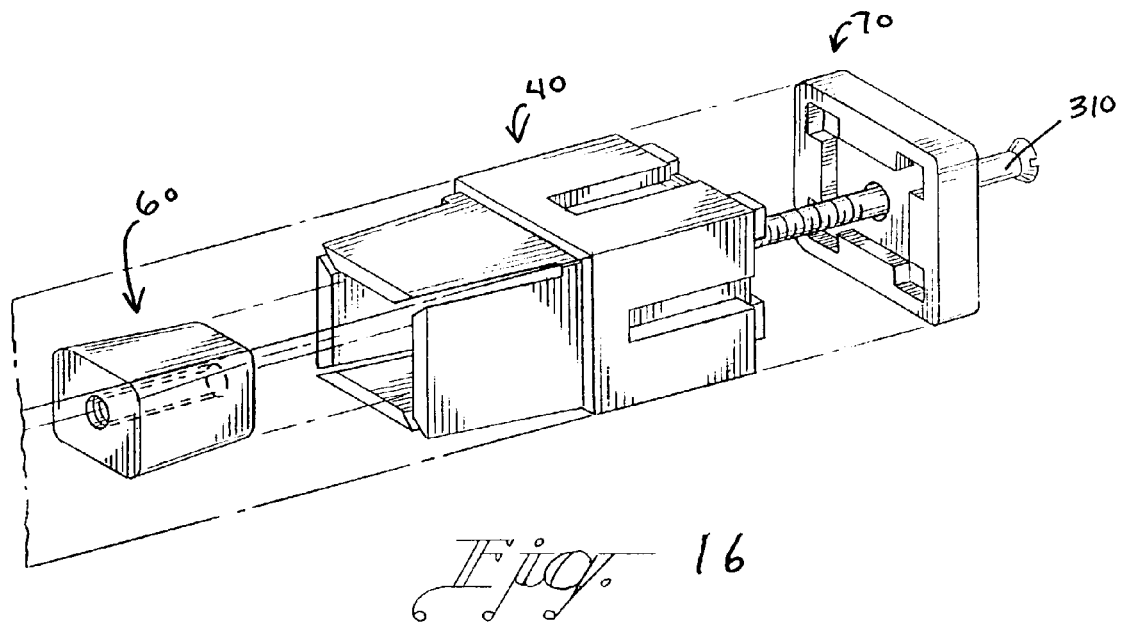
FIG. 16.
Figure 17:
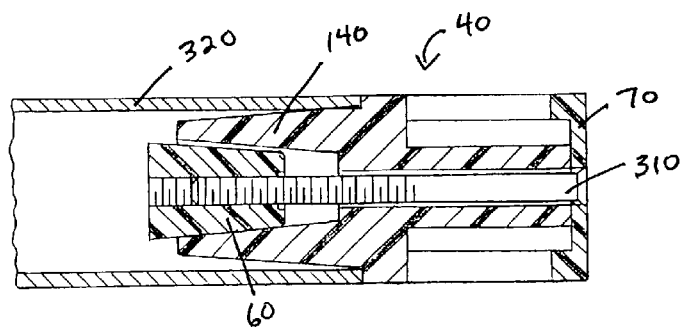
FIG. 17.
Figure 18:
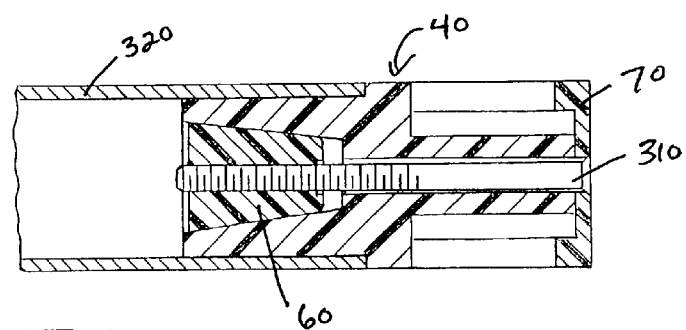
FIG. 18.

FIG. 16 shows a perspective view of the 1 inch square embodiment of the connector apparatus. The elongated fastener 310, preferably a 6-32 machine screw, is placed through the fastener aperture 260 of the connector cap 70 and through the open fastener shaft 130 of the connector body 40 and is threaded into the threads of the open fastener shaft 240 of the wedge member 60. FIG. 17 shows a cross sectional view of a disengaged connector apparatus inserted into an end of a 1 inch square tubular member 320. When the elongated fastener 310 is screwed into the threads of the open fastener shaft 240 of the wedge member 60, the outer sloped faces 250 of the wedge member 60 move against the sloped inner surfaces 210 of the deflectable legs 140, coacting to deflect the deflectable legs 140 outwardly. FIG. 18 shows a cross sectional view of a connector apparatus engaged within an end of a square tubular member 320. The deflectable legs 140 radially deflect toward the inner walls of the tubular member 320, frictionally connecting the connector apparatus to the tubular member 320.

Figure 19:
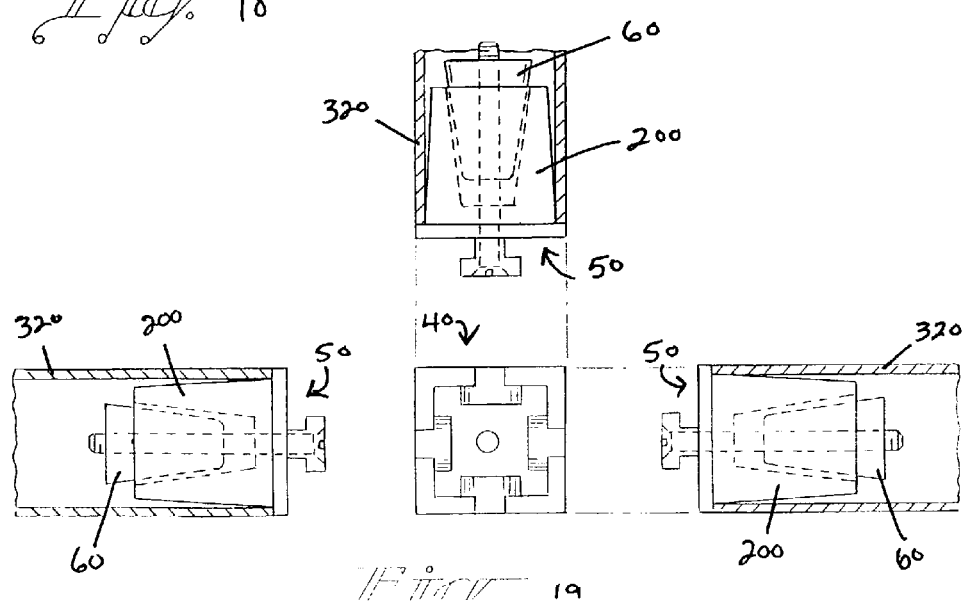
FIG. 19.

FIG. 19 shows a cross sectional view of a plurality of connector ends 50 adjacent a top view of the square embodiment of the connector body 40. Each of the connector ends 50 have deflectable prongs 200 inserted within an open end of a tubular member 320. Wedge members 60 are held among the deflectable prongs 200 by the elongated fastener 310 placed through the open fastener shaft 190. When the elongated fastener 310 is tightened into the threads of the open fastener shaft 240 of the wedge member 60, the sloped outer faces 250 of the wedge member 60 interact with the sloped inner faces 210 of the deflectable prongs 200, deflecting the prongs 200 against the inner walls of the tubular member 320. The connector tabs 185 of the connector ends 50 can then be placed in the connector slots 120 of the connector body 40. The connector cap 70 can then be placed over the top face 125 of the connector body 40 to hold the connector tabs 185 of the connector ends 50 within the connector slots 120. The connector cap 70 is held in place by the head of the elongated fastener 310 as the threads of the elongated fastener 310 are tightened into the threads of the open fastener shaft 240 of the wedge member 60.

Figure 20:
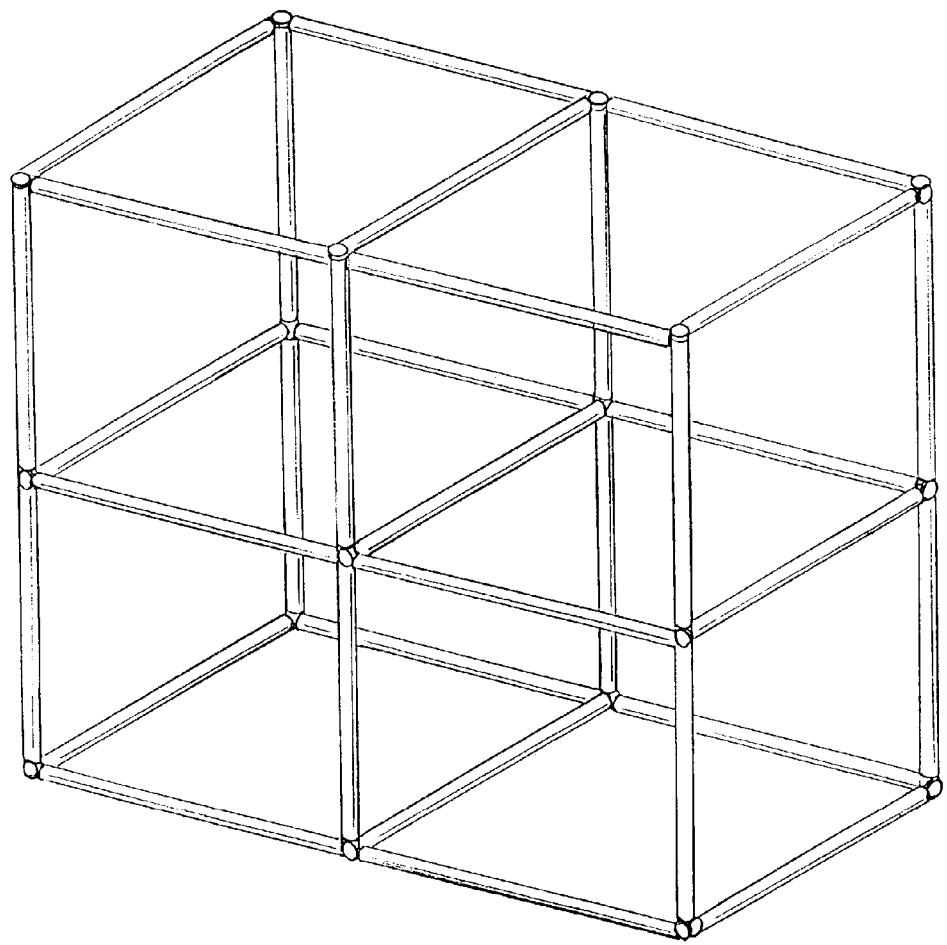
FIG. 20.
Figure 21:
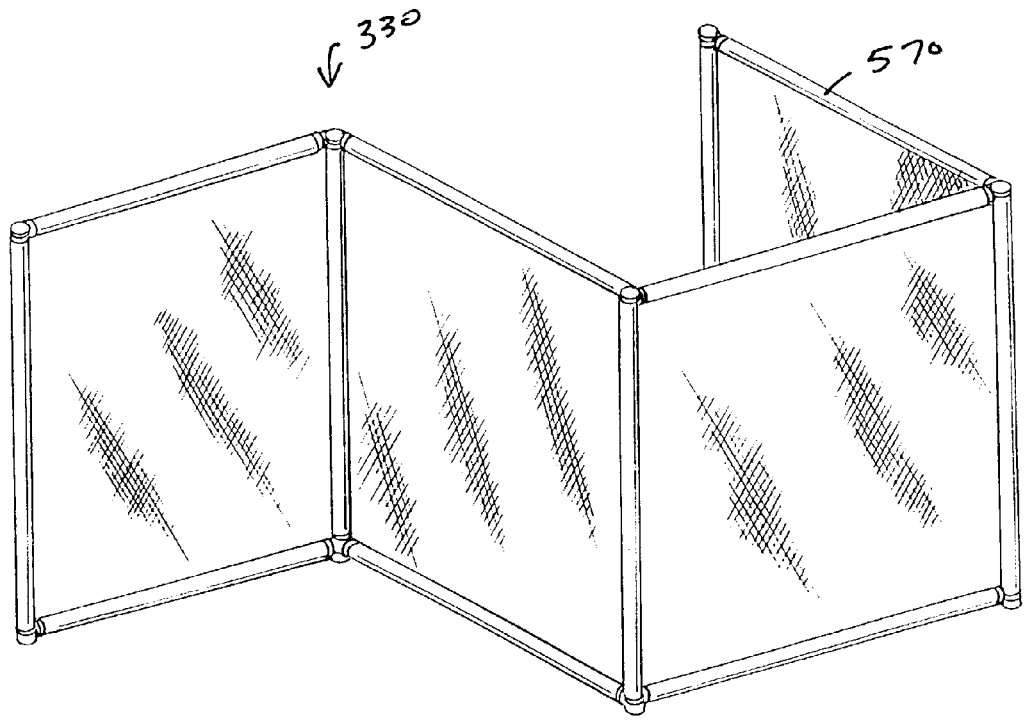
FIG. 21.
Figure 22:
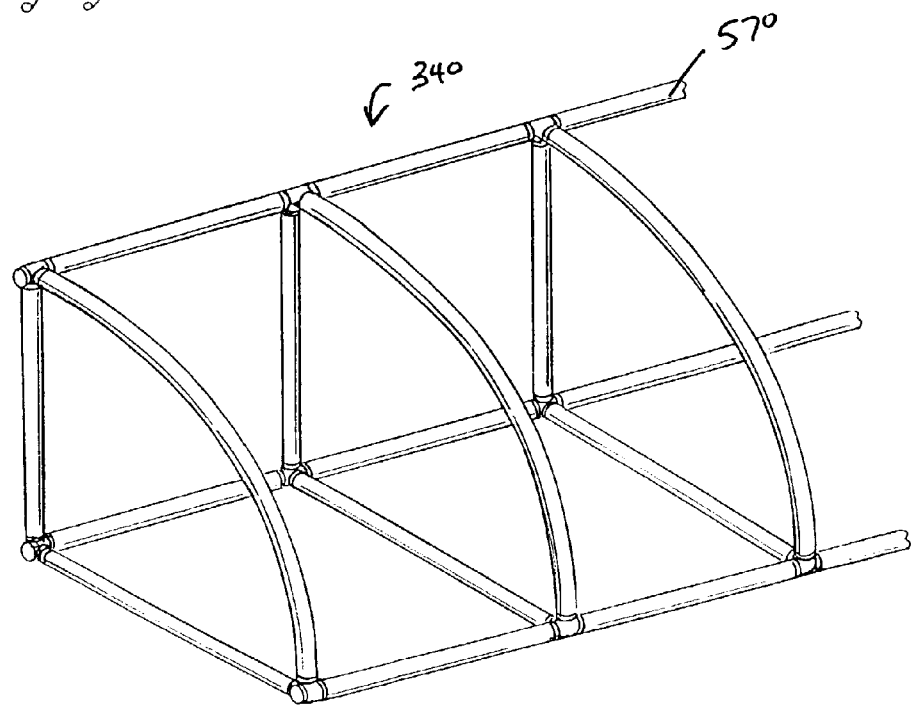
FIG. 22.

FIGS. 20–22 show three different examples of a multi-tubular structure using the 1 inch round connector system embodiment of the claimed invention. FIGS. 21 and 22 show the round embodiment of the claimed invention being used to form office cubicle walls 330 and a building front awning 340.

FIGS. 23 and 24 show a perspective view and a cross sectional view of the round embodiment of the connector body 350 sized and shaped for use with 1 inch round tubing having a diameter of 1.165 inches. The dimensions of the different features of the 1 inch round connector body 350 are similar to those of the 1 inch square embodiment of the claimed invention. The connector body 350 has a plurality of radially spaced connector slots 360 with an open end within a top face of the connector body 350. Each connector slot 360 has an open ended aperture 370 through a side surface 380 of the round connector body 350. A vertically oriented open fastener shaft 390 is centrally located within the round connector body 350. The open fastener shaft 390 has a first open end 392 within the top face of the connector body 350 and a second open end 394 within the bottom of the round connector body 350. A plurality of radially spaced deflectable legs 400 are spaced about the second open end 394 of the open fastener shaft 390 and are offset with regard to the outer side surfaces of the round connector body 350 so that the side surfaces 380 of the round connector body 350 will be substantially flush with the side surfaces of a tubular member when the deflectable legs 400 are inserted within an open end of a round tubular member. The offset of the deflectable legs 400 creates a round shoulder portion 410 to overlie the thickness of the walls of a round tubular member when the deflectable legs 410 are inserted within an open end of a round tubular member. Each deflectable leg 400 has a smoothly sloped inner face 420 that interacts with the sloped outer faces 150 of the wedge member 60 when the wedge member 60 is tightened against the deflectable legs 400.

FIGS. 25 and 26 show a perspective and a cross sectional view of the round embodiment of the connector end 430. The connector end 430 has an arcuately shaped front face 440 to fit flushly against the round side surfaces 380 of the round connector body 350 and a connector tab 450 extending from the arcuately shaped front face 440 that is sized and shaped to be retained by a connector slot 360 of the round connector body 350. A vertically oriented open fastener shaft 460 is centrally located within the round connector end 430. The open fastener shaft 460 has a first open end 462 within the connector tab and a second open end 464 within the bottom of the connector end 430. A plurality of radially positioned deflectable prongs 470 are spaced about the second open end 464 of the open fastener shaft 460 and are offset with regard to the outer side surfaces 380 of the connector body 350 so that the side surfaces 380 of the connector body 350 will be substantially flush with the side surfaces of a tubular member when the deflectable prongs 470 are inserted within an open end of a tubular member. Each deflectable prong 470 has a smoothly sloped inner face 480 that interacts with the sloped outer faces 150 of the wedge member 60 when the wedge member 60 is tightened against the deflectable prongs 470.

Figure 32:
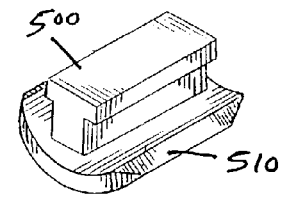
FIG. 32.

FIG. 32 shows a perspective view of the round embodiment of the connector system blank 490. The blank 490 is used to fill connector slots 360 of the round connector body 350 that are not used in the construction of a multi-tubular structure using the apparatus and system of the claimed invention. The blank 490 has a connector tab 500 similar to the connector tab 450 of the connector end 430 and has a rounded spacer panel 510 with a thickness roughly equal to the thickness of the rounded front face 440 of the round connector end 430 to present a uniform appearance about the round connector body 350.

Figure 27:
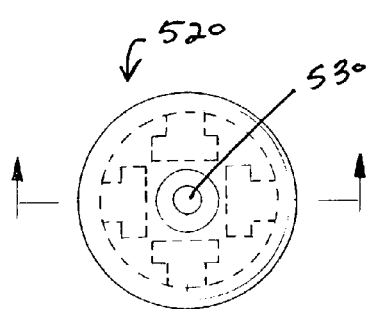
FIG. 27.
Figure 28:
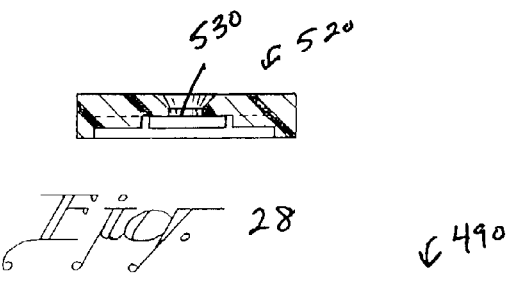
FIG. 28.

FIGS. 27 and 28 shows a top and cross sectional view of the round embodiment of the connector cap 520. The round connector cap has a 1.165 inch diameter to cover the connector slots of the round connector body 350 to hold the connector tabs 450 of the round connector ends 430 in place during use. The round connector cap 520 has a fastener aperture 530 that positioned to be axially aligned with the open fastener shaft 390 of the round connector body 350 when the round connector cap 520 is placed adjacent the top face of the round connector body 350.

Figure 29:
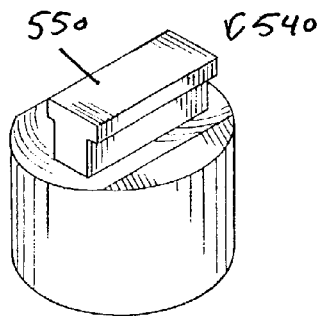
FIG. 29.
Figure 30:
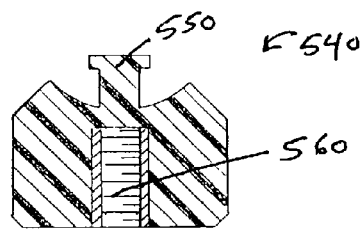
FIG. 30.

FIGS. 29 and 30 show a perspective view and a cross sectional view of the round embodiment of the connector system leveler body 540. The round leveler body 540 has a connector tab 550 similar to that of the round connector end 430 for placement within the connector slots 360 of the round connector body 350 when the connector system is used to construct a multi-tubular structure. The round leveler body 540 has a ¼×20 threaded insert 560 for receiving a foot (not shown) with a threaded stud to be variably engaged with the threads of the threaded insert 560. The connector system may also include a plurality of feet of this type to level a multi-tubular structure such as those shown in FIGS. 20 and 21.

Figure 31:
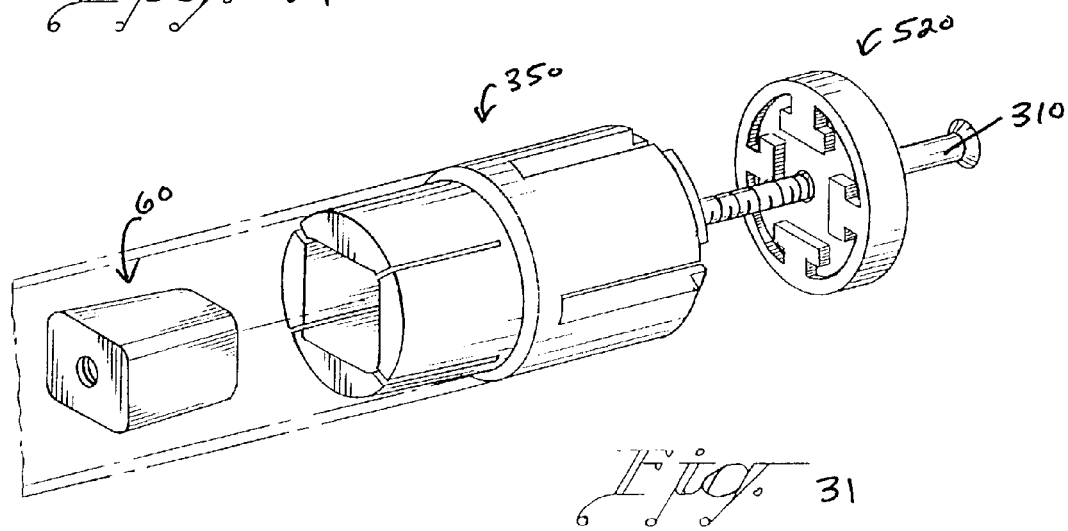
FIG. 31.
Figure 47:
FIG. 47.
Figure 45:
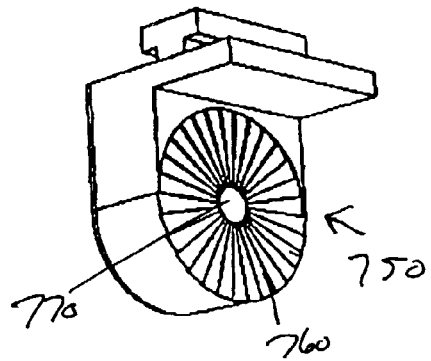
FIG. 45.
Figure 46:
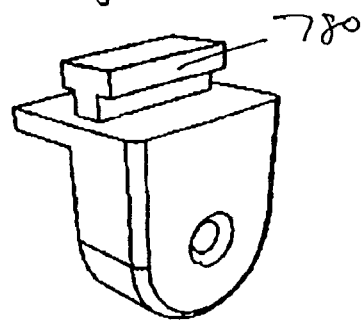
FIG. 46.
Figure 48:
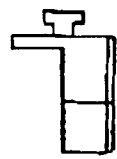
FIG. 48.
Figure 49:
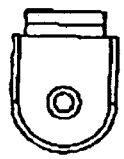
FIG. 49.

FIG. 31 shows a perspective view of the round embodiment of the connector apparatus. The elongated fastener 310 is placed through the fastener aperture 530 of the round connector cap 520 and through the open fastener shaft 390 of the round connector body 350 and is threaded into the threads of the open fastener shaft 240 of the wedge member 60. FIG. 17 shows a cross sectional view of a disengaged connector apparatus inserted into an end of a round tubular member 570. When the elongated fastener 310 is screwed into the threads of the open fastener shaft 240 of the wedge member 60, the outer sloped faces 250 of the wedge member 60 move against the sloped inner surfaces 480 of the deflectable legs 400, coacting to deflect the deflectable legs 400 outwardly. The round connector apparatus frictionally engages the inner walls of a round tubular member 570 in the same way that the square connector apparatus engages the inner walls of a square tubular member 570 as shown in FIGS. 18 and 19.

FIG. 32 shows a perspective view of the round embodiment of the connector system blank 572. The round blank 572 is used to fill connector slots 360 of the connector body 350 that are not used in the construction of a multi-tubular structure using the apparatus and system of the claimed invention. The blank 572 has a connector tab 574 similar to the connector tab 185 of the connector tab 185 of the connector end 50 and has a rounded spacer panel 576.

FIGS. 33–38 show the male angular connector end 100 has a receiving face 580 with a plurality of angularly protruding ridges 590 spaced radially about an aperture 600 through the receiving face 580 and are sized and shaped to matingly engage the angularly protruding ridges of the angular adapter 110 during use. The angular connector end 100 is used in conjunction with other parts of the connector system to create multi-tubular structure having tubular ends that meet at a variety of different angles. The shoulder portion 610 has a front face 620 perpendicular to the receiving face 580 with a centrally located aperture 630. A plurality of deflectable prongs 640 having a smoothly sloped inner faces 650 are spaced about the aperture of the shoulder portion 610. A wedge or expansion member 60 as shown in FIGS. 8 and 9 can be used to deflect the deflectable prongs 640 when a fastener 310 is used to tighten the wedge member 60 against the sloped inner faces 650 of the deflectable prongs 640 so that the angular connector end 100 may be frictionally connected to a tubular member 320 as shown in the FIGS. 18 and 19.

FIGS. 39–44 show the female angular connector end 660 sized and shaped to be used with 1 inch square tubing. The female angular connector end 660 is used in conjunction with the angular connector end 100 and other parts of the connector system to create multi-tubular structure having tubular ends that meet at a variety of different angles. The female angular connector end 660 has a receiving face 670 with a plurality of angularly protruding ridges 680 spaced radially about an aperture 690 through the receiving face 670 and are sized and shaped to matingly engage the angularly protruding ridges 680 of the male angular connector end 100 during use. A ¼-20 threaded knurled insert within the aperture 690 of the receiving face 670 receives a ¼-20 threaded machine screw that connects the male angular connector end 100 to the female angular connector end 660 during use.

The shoulder portion 700 has a front face 710 perpendicular to the receiving face 670 with a centrally located aperture 720. A plurality of deflectable prongs 730 having a smoothly sloped inner faces 740 are spaced about the aperture 720 of the shoulder portion 700. A wedge or expansion member 60 as shown in FIGS. 8 and 9 can be used to deflect the deflectable prongs 730 when a fastener 310 is used to tighten the wedge member 60 against the sloped inner faces 740 of the deflectable prongs 730 so that the female angular connector end 660 may be frictionally connected to a tubular member 320 as shown in the FIGS. 18 and 19.

FIGS. 45–49 show the angular adapter 110 of the connector system sized and shaped for use with 1 inch square tubing. The angular adapter 110 has a receiving face 750 with a plurality of angularly protruding ridges 760 spaced radially about an aperture 770 through the receiving face 750. The protruding ridges 760 are sized and shaped to matingly engage the protruding ridges 680 of the connector end 660 and the protruding ridges 590 of the angular connector end 100. A connector tab 780 sized and shaped to be removably retained within a connecting slot 120 of the connector body 40 extends perpendicularly from the receiving face 750.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A tubular connector system for multi-tubular structure, the system comprising:
   a connector body having a plurality of radially spaced connecting slots, each connecting slot having an open end within a top face of the connector body and an open ended aperture through a side surface of the connector body;
   a first open fastener shaft centrally located within the connector body;
   a plurality of radially spaced deflectable legs about the first open fastener shaft connected to the connector body;
   a wedge member sized and shaped to fit among the plurality of radially spaced deflectable legs, the wedge member having a second open fastener shaft positioned within the wedge member to be axially aligned with the first open fastener shaft of the connector body;
   a connector cap sized and shaped to cover the connecting slots and open ended apertures of the connecting slots, the connector cap having a fastener aperture positioned to be axially aligned with the first open fastener shaft of the connector body;
   an elongated fastener sized and shaped to fit through the fastener aperture of the connector cap, first open fastener shaft of the connector body, and second open fastener shaft of the wedge member, the elongated fastener providing means for tensioning the wedge member against the plurality of deflectable legs; and
   a plurality of tubular connector ends having a front face shaped to fit flushly adjacent to the connector body and connecting tabs extending from the face of each of the connector ends sized and shaped for sliding insertion through the open end of the connecting slots, the tubular connector ends having a connector portion sized and shaped to fit within an open end of a tubular member.

2. The system of claim 1 wherein the connector portion of the plurality of tubular connector ends comprises at least one deflectable prong connected to the front face having a smoothly sloped inner face and an expansion member having at least one smoothly sloped outer face sized to coact with the inner face of the deflectable prong.

3. The system of claim 2 wherein the plurality of tubular connector ends further comprise a second elongated fastener providing means for tensioning the expansion member against the deflectable prong.

4. The system of claim 3 wherein the plurality of tubular connector ends further comprise a third open fastener shaft centered within the tubular connector ends sized and shaped to receive the second elongated fastener.

5. The system of claim 4 wherein the expansion member has a fourth open fastener shaft positioned within the expansion member to be axially aligned with the third open fastener shaft of the tubular connector ends, the second elongated fastener extending through the fourth open fastener shaft.

6. A multi-tubular structure having an improved tubular connector system connecting the multiple tubes of the multi-tubular structure, the structure comprising:
   a connector body having a plurality of radially spaced connector slots, each connector slot having an open end within a top face of the connector body and an open ended aperture through a side surface of the connector body in unobstructed communication with the open end within the top face;
   a first open fastener shaft centrally located within the connector body;
   a plurality of radially spaced deflectable legs about the first open fastener shaft connector to the connector body inserted within a first open end of a first tubular member, the plurality of radially spaced deflectable legs adjacent inner walls of the first tubular member;
   a wedge member sized and shaped to fit among the plurality of radially spaced deflectable legs, the wedge member having a second open fastener shaft positioned within the wedge member to be axially aligned with the first open fastener shaft of the connector body;
   an elongated fastener sized and shaped to fit through the first open fastener shaft of the connector body and the second open fastener shaft of the wedge member, the elongated fastener providing means for tensioning the wedge member against the plurality of deflectable legs to simultaneously radially deflect the plurality of deflectable legs against the first open end of the first tubular member;
   a first tubular connector end having a front face shaped to fit flushly against the side surface of the connector body and a connector tab extending from the front face of the connector end for unobstructed sliding insertion into the connector slot through the open end within the top face of the connector body into the open ended aperture through the side surface of the connector body;
   a plurality of radially positioned deflectable prongs connected to the first tubular connector end opposite the connector tab inserted within a first open end of a second tubular member, each of the plurality of radially positioned deflectable prongs having a smoothly sloped inner face, the plurality of radially positioned deflectable prongs adjacent inner walls of the second tubular member;
   a first expansion member having a plurality of smoothly sloped outer faces sized to coact with the inner faces of the deflectable prongs of the first tubular connector end;
   a second elongated fastener providing means for tensioning the expansion member against the inner faces of the deflectable prongs simultaneously radially deflecting the deflectable prongs against the first open end of the second tubular member.

7. The structure of claim 6 further comprising a shoulder portion about the connector body sized and shaped to substantially correspond to size and shape of the first tubular member.

8. The structure of clam 7 further comprising a shoulder portion about the connector end sized and shaped to substantially correspond to size and shape of the second tubular member.

9. The structure of claim 8 further comprising a connector cap sized and shaped to cover the connector slots of the connector body, the connector cap having a fastener aperture positioned to be axially aligned with the first open fastener shaft of the connector body when the connector cap is placed adjacent the top face of the connector body.

10. The system of claim 9 further comprising threads within the second open fastner shaft of the wedge member sized and shaped to matingly engage threads about the first elongated fastner.

11. The system of claim 10 wherein the second elongated fastener threadedly engages the expansion member.

12. A tubular connector system for multi-tubular structures, the system comprising:
   a connector body having a round peripheral side surface;
   a first open fastener shaft concentrically located within the connector body;
   a plurality of connector slots within the connector body radially spaced about the first open fastener shaft having an aperture through the side surface of the connector body, each connector slot and aperture having open ends within a top face of the connector body in unobstructed communication with the apertures through the side surface;
   a plurality of radially spaced deflectable legs about the first open fastener shaft connected to the connector body opposite the top face of the connector body, each deflectable leg having a smoothly sloped inner face, the deflectable legs offset from the peripheral side surface of the connector body so that an outer surface of a round tubular member is substantially flush with the peripheral side surface of the connector body;
   a wedge member having a plurality of smoothly sloped outer faces sized to coact with the inner faces of the deflectable legs and a second open fastener shaft through the wedge member, the second open fastener shaft positioned within the wedge member to be axially aligned with the first open fastener shaft of the connector body when the wedge member is placed among the deflectable legs;
   a connector cap sized and shaped to cover the connector slots and apertures of the connector slots, the connector cap having a fastener aperture positioned to be axially aligned with the first open fastener shaft of the connector body;
   an elongated fastener sized and shaped to fit through the fastener aperture of the connector cap, first open fastener shaft of the connector body, and second open fastener shaft of the wedge member, the elongated fastener providing means for tensioning the wedge member against the deflectable leg outwardly deflecting the deflectable leg;
   a plurality of tubular connector ends having a arcuate front face shaped to fit flushly adjacent the peripheral side surface of the connector body and connector tabs extending from the front face of each of the connector ends for unobstructed sliding insertion through the open end of the connector slots within the top surface of the connector body and into the apertures through the side surface of the connector body, the tubular connector ends having a connector portion sized and shaped to fit within an open end of a round tubular member.

13. The system of claim 12 wherein the connecting portion of the plurality of tubular connector ends comprises at least one deflectable prong connected to the front face having a smoothly sloped inner face and an expansion member having at least one smoothly sloped outer face sized to coact with the inner face of the deflectable prong.

14. A tubular connector system for mult-tubular structure, the system comprising:
- a connector body having a top face and a side surface;
- a first one fastener shaft through the connector tody;
- a connector slot within the connector body having an open end within the top face of the connector body and an aperture through the side surface of the connector body;
- a connector end having a first connector tab portion sized and shaped for sliding insertion through the open end of the connecting slot and a second connector tab portion for extension through the aperture through the side surface of the connector body;
- a connector cap sized and shaped to cover the open end of the connecting slot having a fastener aperture positioned to be axially aligned with the first open fastener shaft of the connector body when the connector cap is placed adjacent the top face of the connector body;
- an elongated fastener sized and shaped to fit through the fastener aperture of the connector cap and the first open fastener of the connector body fastening the connector cap to the top face of the connector body during use, seating the connector cap against the open end of the connecting slot for retention of the first connector tab portion within the connecting slot,
- a third fastener shaft through the connector end having a first open end within the first connector tab portion of the connector end;
- at least one deflectable leg connected to the connector end opposite the first and second connector tab portions having a smoothly sloped inner face adjacent the third fastener shaft of the connector end; and
- a wedge member having at least one smoothly sloped outer face sized to coact with the inner face of the deflectable leg and a fourth open fastener shaft through the wedge member, the fourth open fastener shaft positioned within the wedge member to be axially aligned with the third open fastener shaft of the connector end.

* * * * *